United States Patent
Adjemian

(10) Patent No.: US 10,984,392 B2
(45) Date of Patent: Apr. 20, 2021

(54) PROVIDING MULTI-SESSION EVENT INVITATION

(71) Applicant: Microsoft Technology Licensing, LLC, Redmond, WA (US)

(72) Inventor: Monica Adjemian, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 309 days.

(21) Appl. No.: 15/479,309

(22) Filed: Apr. 5, 2017

(65) Prior Publication Data
US 2018/0293548 A1  Oct. 11, 2018

(51) Int. Cl.
G06Q 10/10 (2012.01)
H04L 29/06 (2006.01)

(52) U.S. Cl.
CPC ..... G06Q 10/1095 (2013.01); H04L 65/1069 (2013.01); H04L 65/403 (2013.01)

(58) Field of Classification Search
None
See application file for complete search history.

(56) References Cited

U.S. PATENT DOCUMENTS

| 6,457,045 | B1 | 9/2002 | Hanson et al. | |
| 7,395,221 | B2* | 7/2008 | Doss | G06Q 10/06314 705/7.19 |
| 2005/0102245 | A1* | 5/2005 | Edlund | G06Q 10/109 705/80 |
| 2006/0200374 | A1* | 9/2006 | Nelken | G06Q 10/109 705/7.19 |
| 2008/0270914 | A1* | 10/2008 | Kikin-Gil | G06Q 10/109 715/751 |
| 2008/0307323 | A1* | 12/2008 | Coffman | G06Q 10/109 715/753 |
| 2009/0204464 | A1* | 8/2009 | Mujkic | G06Q 10/109 705/7.19 |

(Continued)

FOREIGN PATENT DOCUMENTS

| WO | WO-2010080347 | A2 * | 7/2010 | G06Q 10/109 |
| WO | WO-2015184314 | A1 * | 12/2015 | G06Q 10/1095 |
| WO | WO-2016081325 | A1 * | 5/2016 | G06Q 10/1093 |

OTHER PUBLICATIONS

Silva, Sônia Fernandes, and Tiziana Catarci. "Visualization of linear time-oriented data: a survey." Proceedings of the first international conference on web information systems engineering. vol. 1. IEEE, 2000. (Year: 2000).*

Bederson, Benjamin B., et al. "DateLens: A fisheye calendar interface for PDAs." ACM Transactions on Computer-Human Interaction (TOCHI) 11.1 (2004): 90-119. (Year: 2004).*

Hund, Philipp M., John Dowell, and Karsten Mueller. "Representation of time in digital calendars: An argument for a unified, continuous and multi-granular calendar view." International journal of human-computer studies 72.1 (2014): 1-11. (Year: 2014).*

(Continued)

*Primary Examiner* — Matthew S Gart
*Assistant Examiner* — Derick J Holzmacher
(74) *Attorney, Agent, or Firm* — Michael Best & Friedrich LLP

(57) ABSTRACT

A multi-session event invitation is described. A productivity application initiates operations to provide the multi-session event invitation upon detecting a request to schedule an event with session options. Invitee(s) and information associated with the session options is determined for the event. Next, the multi-session event invitation is generated based on the information associated with the session options. Furthermore, the multi-session event invitation is transmitted to the invitee(s).

19 Claims, 8 Drawing Sheets

(56) References Cited

U.S. PATENT DOCUMENTS

| | | | | |
|---|---|---|---|---|
| 2010/0223089 A1* | 9/2010 | Godfrey | G06Q 10/1095 | 705/7.19 |
| 2010/0241480 A1* | 9/2010 | Rokhlin | G06Q 10/109 | 705/7.18 |
| 2010/0250366 A1* | 9/2010 | Smith | G01C 21/20 | 705/14.58 |
| 2012/0304088 A1* | 11/2012 | Kho | G06Q 10/109 | 715/764 |
| 2013/0290058 A1* | 10/2013 | Gray | G06Q 10/1095 | 705/7.19 |
| 2014/0067454 A1 | 3/2014 | Varoglu et al. | | |
| 2014/0164043 A1* | 6/2014 | Jordan | G06Q 10/1095 | 705/7.19 |
| 2014/0172483 A1* | 6/2014 | Bellers | G06Q 50/14 | 705/7.16 |
| 2014/0229560 A1* | 8/2014 | Gray | H04L 12/1818 | 709/206 |
| 2014/0372162 A1* | 12/2014 | Dhara | G06Q 10/1095 | 705/7.19 |
| 2014/0379408 A1* | 12/2014 | Kelly | G06Q 10/1095 | 705/7.19 |
| 2015/0269532 A1* | 9/2015 | Coffman | G06Q 10/109 | 705/7.19 |
| 2015/0347980 A1* | 12/2015 | White | G06Q 10/1095 | 705/7.19 |
| 2016/0140508 A1* | 5/2016 | Ossia | G06Q 10/1095 | 705/7.19 |
| 2016/0247122 A1 | 8/2016 | Wong et al. | | |
| 2017/0024706 A1* | 1/2017 | Agranov | G06Q 10/063 | |

OTHER PUBLICATIONS

Poremsky, Diane, "How to Create a Pick-a-Meeting Request", https://www.slipstick.com/outlook/calendar/create-a-pick-a-meeting-request/, Published on: Oct. 6, 2011, 11 pages.

"Schedule group meetings, faster", https://www.vyte.in/group, Retrieved on: Feb. 27, 2017, 4 pages.

"Schedule events the easy way", https://xoyondo.com/, Published on: Oct. 16, 2014, 3 pages.

"Calendar Connect", https://doodle.com/features/calendar-connect, Published on: Jun. 12, 2014, 2 pages.

Dupont, Paula, "The 16 Best Meeting Scheduler Apps and Tools", https://zapier.com/blog/best-meeting-scheduler-apps/, Published on: Dec. 2, 2014, 21 pages.

"Scheduling a meeting is Simple", http://www.needtomeet.com/, Published on: Jan. 18, 2017, 3 pages.

"Multiple meeting invitations in a single Outlook message—is this possible?", https://answers.microsoft.com/en-us/msoffice/forum/msoffice_outlook-mso_other/multiple-meeting-invitations-in-a-single-outlook/8415e446-bef6-4fc4-a3ff-3e0e3936fce9, Published on: Jan. 13, 2011, 7 pages.

Mathe, Olof, "Send calendar invites directly from your email", https://mixmax.com/blog/send-calendar-invites, Published on: Jul. 31, 2016, 5 pages.

Pott, Alastair, "Send Multiple Invites in One Email—User to then choose Event to attend", https://productforums.google.com/forum/, Published on: Jul. 15, 2015, 2 pages.

Michelle, "Can I send multiple calendar invites in a marketing email and track RSVPs?", https://productforums.google.com/forum/, Published on: Jan. 22, 2016, 2 pages.

* cited by examiner

PROVIDING MULTI-SESSION EVENT INVITATION

BACKGROUND

Automation and improvements in processes have expanded scope of capabilities offered for personal and business information consumption. With the development of faster and smaller electronics, providing elaborate features (that improve functionality) in schedule management have become feasible. Indeed, systems provided to manage schedules have become common features in modern personal and work environments. Such systems execute a wide variety of applications ranging from productivity applications to schedule management applications.

Increasingly, cloud based content providers are utilized for managing schedule(s) associated with user(s), where the cloud based content providers have client interface(s) that automatically monitor information associated with the user (s). However, there are currently significant gaps when creating an event invitation with multiple choices for a time-period of the event. Personnel resources are unnecessarily consumed for creation and management of the event invitation. Lack of relevant event invitation creation schemes cause poor management of personnel resources when attempting to generate an event invitation with multiple time-period selections.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a multi-session event invitation. A productivity application, according to embodiments, may initiate operations to provide the multi-session event invitation upon detecting a request to schedule an event with session options. Invitee(s) and information associated with the session options may be determined for the event. Next, the multi-session event invitation may be generated based on the information associated with the session options. Furthermore, the multi-session event invitation may be transmitted to the invitee(s).

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
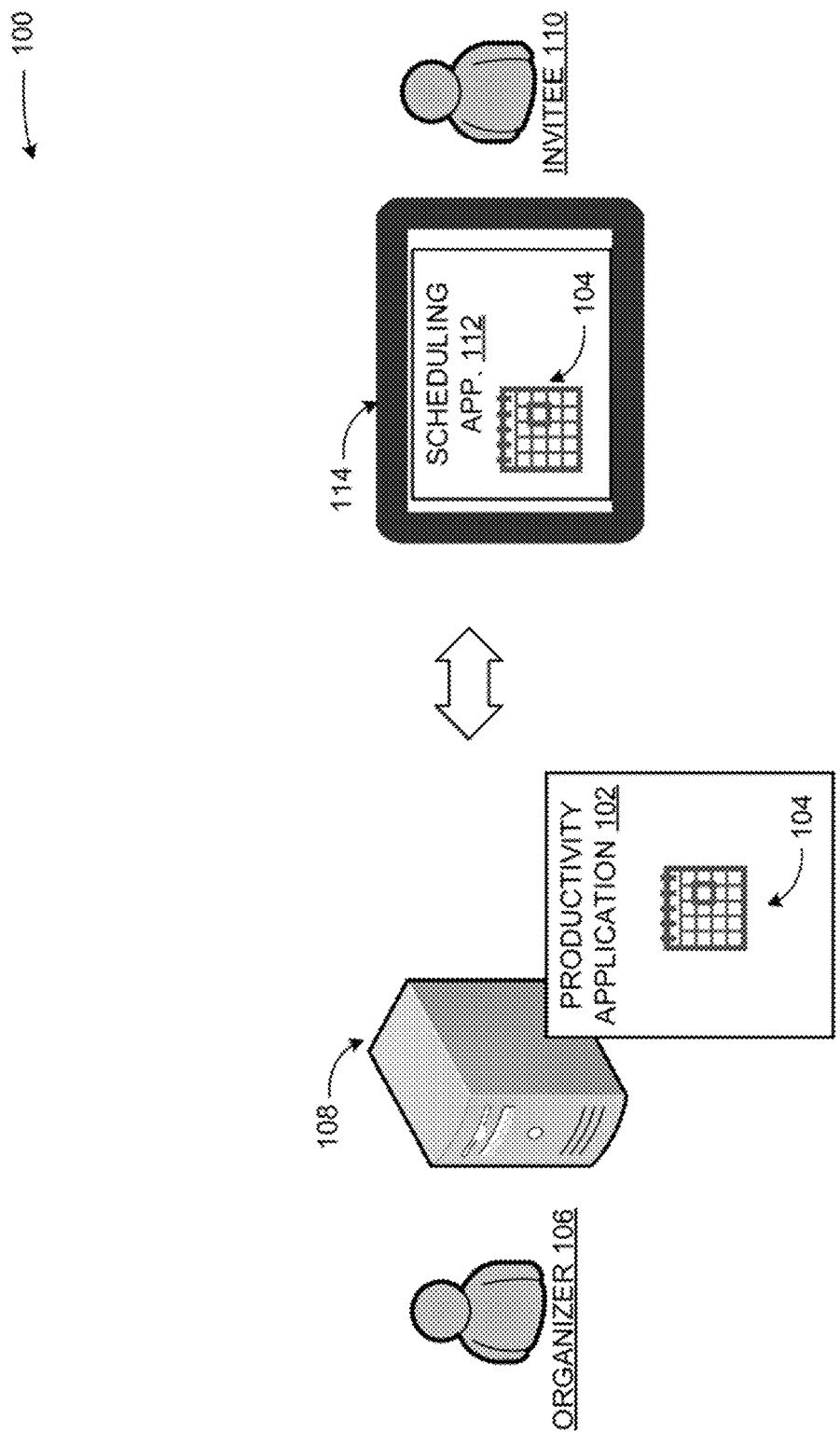
FIG. 1 is a conceptual diagram illustrating an example of providing a multi-session event invitation, according to embodiments.

As briefly described above, a productivity application may detect a request to schedule an event with session options. The event may include an activity that spans a time-period. In an example scenario, attendance in the event may not be optional however, multiple choices as time slots for the event may be presented as the session options. A session option may include a time-period choice which an invitee may select for the event. Invitee(s) and information associated with the session options may be determined for the event. The invitee may select one of the session options for the event. The invitee may not have to attend non-selected session options. The information associated with the session options may include a direct input from an organizer of the event, a schedule of the organizer of the event, schedule(s) of the invitee(s).

Next, the multi-session event invitation may be generated based on the information associated with the session options. The multi-session event invitation may include a start time, an end time, a location, a content, and/or an access option associated with the session options. The multi-session event invitation may be transmitted to the invitee(s). The multi-session event invitation may be sent to a scheduling application (associated with an invitee) for rendering of the multi-session event invitation in a calendar view associated with the scheduling application.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a multi-session event invitation. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating examples of providing a multi-session event invitation, according to embodiments.

In a diagram 100, a computing device 108 may execute a productivity application 102. The computing device 108 may include a physical computer (such as a desktop computer and/or a server), a mobile computing device (such as a smart phone), and/or similar ones. The computing device 108 may also include a special purpose and/or configured device that is optimized to execute data operations associated with the productivity application 102. For example, the computing device 108 may include physical components that are custom built to create, process, and/or transmit a multi-session event invitation 104 through computation core(s) tailored to process operations associated with the multi-session event invitation 104.

The computing device 108 may execute the productivity application 102. The productivity application 102 may include a schedule management application, and/or an application configured to manage event(s), among others. The productivity application 102 may initiate operations to provide the multi-session event invitation 104 upon detecting a request to schedule an event with session options. The event may include an activity that spans a time-period. In an example scenario, attendance in the event may not be optional however, multiple choices as time slots for the event may be presented as the session options. A session option may include a time-period choice which an invitee 110 may select for the event. The invitee 110 and information associated with the session options may be determined for the event.

The invitee 110 may include an entity (such as a person and/or a virtual entity) who is allowed to select one of the session options for the event. The productivity application 102 may create the event from the selected session option. As such, the invitee 110 may not have to attend non-selected session options. The information associated with the session options may include a direct input from an organizer 106 of the event, a schedule of the organizer 106 of the event, a schedule of the invitee 110. The organizer 106 may include an entity (such as a person and/or a virtual entity) who interacts with a user interface of the productivity application 102 to create the multi-session event invitation 104.

Next, the productivity application 102 may generate the multi-session event invitation 104 based on the information associated with the session options. The multi-session event invitation 104 may include a start time, an end time, a location, a content, and/or an access option associated with the session options. The productivity application 102 may transmit the multi-session event invitation to a scheduling application 112 and/or service associated with the invitee 110. The scheduling application 112 and/or service may be provided to the invitee 110 by a client device 114. The scheduling application 112 and/or service may be instructed to render the multi-session event invitation in a calendar view to the invitee 110.

The computing device 108 may communicate with other client device(s) or server(s) through a network. The network may provide wired or wireless communications between network nodes such as the computing device 108, the client device 114, other client device(s) and/or server(s), among others. Previous example(s) to provide a multi-session event invitation 104 with the productivity application 102 are not provided in a limiting sense. Alternatively, the multi-session event invitation 104 may be generated by an application programming interface (API) and/or a third party application. Furthermore, a service hosted by the computing device 108 (such as a physical server) may provide a client interface such as the productivity application 102 that generates the multi-session event invitation 104 at the computing device 108.

The organizer 106 may interact with the productivity application 102 (or a client interface) with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 108, the productivity application 102, embodiments are not limited to these components or system configurations and can be implemented with other system configuration employing fewer or additional components.

Figure 2:
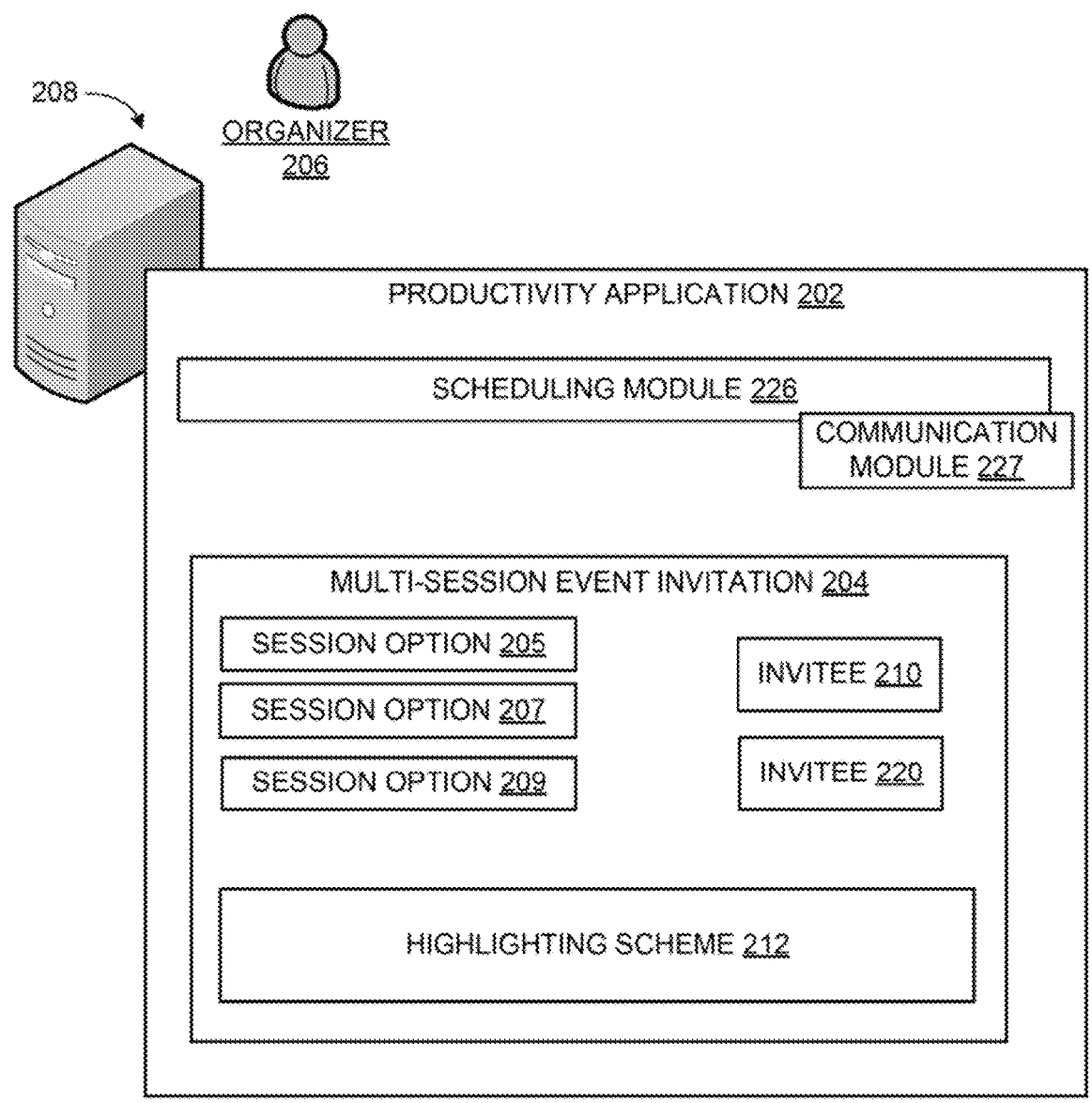
FIG. 2 is a display diagram illustrating example components of a productivity application that provides a multi-session event invitation, according to embodiments.

FIG. 2 is a display diagram illustrating example components of a productivity application that provides a multi-session event invitation according to embodiments.

In a diagram 200, a scheduling module 226 of a productivity application 202 may generate a multi-session event invitation 204. The multi-session event invitation 204 may include session options (205, 207, and 209) which are time-period choices for an event associated with the multi-session event invitation 204. The multi-session event invitation 204 may also include invitees (210 and 220).

The scheduling module 226 may determine the invitees (210 and 220) from a direct input by an organizer 206. For example, the organizer 206 may provide the invitees (210 and 220) by selecting the invitees (210 and 220) from a list of candidates and/or by manually providing the invitees (210 and 220). The organizer 206 may input identifier(s) associated with the invitees (210 and 220). The identifier(s) may be compared and verified against a user profile source. A notification may be sent to the organizer 206 to correct any identifier(s) that were not verified against the user profile source. For invitee(s) who are not listed in the user profile source (such as external users), the organizer 206 may be allowed to overwrite any verification scheme.

Alternatively, the invitees (210 and 220) may be inferred by the scheduling module 226. For example, the scheduling module 226 may infer the invitees (210 and 220) from participant(s) who work in a project related to the multi-session event invitation 204. The invitees (210 and 220) may also be selected from peers, co-workers, and/or other relations of the organizer 206 based on a common attribute and/or property based on the multi-session event invitation 204. The common attribute and/or property may be specified by the organizer 206 and/or inferred based on a property of the multi-session event invitation 204 (such as a title and/or content associated with the multi-session event invitation 204).

The scheduling module 226 may also infer the invitees (210 and 220) based on presence and/or location information. For example, the organizer 206 may provide a pool of invitees from which to select the invitees (210 and 220) for the multi-session event invitation 204. Alternatively, the pool of invitees may be automatically selected from relations of the organizer (or other party) based on related attributes such as a participation in a project associated with the event, a role associated with the event, and/or an organizational relation to the organizer 206, among others.

The presence information associated with the pool of invitees may be queried and retrieved from a scheduling provider associated with the pool of invitees. The invitees (210 and 220) may be selected from the pool of invitees if the presence information associated with the invitees (210 and 220) describe the invitees (210 and 220) as available during the session options (205, 207, and 209).

The location information associated with the pool of invitees may also be queried and retrieved from a scheduling provider associated with the pool of invitees (and/or client devices associated with the pool of invitees). The invitees (210 and 220) may be selected from the pool of invitees if the location information describe the invitees (210 and 220) as in a proximity to the event during the session options (205, 207, and 209). For example, some of the pool of the invitees who may arrive at the event on time may be selected for the multi-session event invitation 204. Distance between the pool of invitees and the location of the event (and mode of travel available to the pool of invitees) may be evaluated to estimate whether some of the pool of invitees may arrive at the event on time. The invitees (210 and 220) may be selected for the multi-session event invitation 204 upon determining that the invitees (210 and 220) may arrive the event on time during the session options (205, 207, and 209).

The information associated with the session options (205, 207, and 209) may be determined based on a direct input from the organizer 206, a schedule of the organizer 206 (of the event), and schedules of the invitees (210 and 220). For example, time-periods selected by the organizer 206 (as provided in the direct input) may be used as the session options (205, 207, and 209). Furthermore, the schedules of the invitees (210 and 220) may be analyzed to identify shared available time-periods. The shared available time-periods may be designated as the session options (205, 207, and 209).

The information associated with session options (205, 207, and 209) may include a start time, an end time, a location, a content, and an access option for the session options (205, 207, and 209). For example, the information may specify a start time (a date, an hour, and minutes), an end time (a date, an hour, and minutes), in an event room (selected by the organizer 206), a document associated with a subject of the event, and the access option. The access option may include a physical meeting, an online meeting, a conference call, and/or a video call, among others.

A physical meeting may include a meeting between the invitees (210 and 220) (and the organizer 206) in person in a meeting location as designated by the organizer 206 and/or inferred from information associated with the organizer 206 and/or the invitees (210 and 220). The online meeting may include a virtual meeting through a communication modality such as a text based communication, a voice based communication, video based communication, and/or a combination of each modality, among others. Event content may also be exchanged along with or in addition to the communication modality.

The conference call may include a phone based or other voice based communication between attendees of the event (such as the invitees (210 and 220) or the organizer 206). The video call may include a video based communication established between the attendees of the event who may partake in the event.

A communication module 227 of the productivity application 202 may transmit the multi-session event invitation 204 to scheduling application(s) and/or service(s) associated with the invitees (210 and 220). The scheduling application(s) and/or service(s) may be instructed to render the session options (205, 207, and 209) with a highlighting scheme 212 in a calendar view of the scheduling application(s) and/or service(s). For example, the highlighting scheme 212 may include a coloring based scheme, a shading based scheme, a text formatting based scheme, a graphic based scheme, a structure based scheme, and/or an animation based scheme to contrast the multi-session event invitation 204 from other event(s) on the calendar view(s) of the scheduling application(s) and/or service(s).

The highlighting scheme 212 may be provided as an optional feature for rendering by the scheduling application(s) and/or service(s). The scheduling application(s) and/or service(s) may be instructed to choose whether to apply the highlighting scheme 212 to differentiate the multi-session event invitation 204 from other event(s) on the calendar view(s). The scheduling application(s) and/or service(s) may also be allowed to render the multi-session event invitation 204 similar to other event(s), and/or use other highlighting scheme (associated with the scheduling application(s) and/or service(s)) to differentiate the multi-session event invitation 204 from other event(s) on the calendar view(s).

Figure 3:
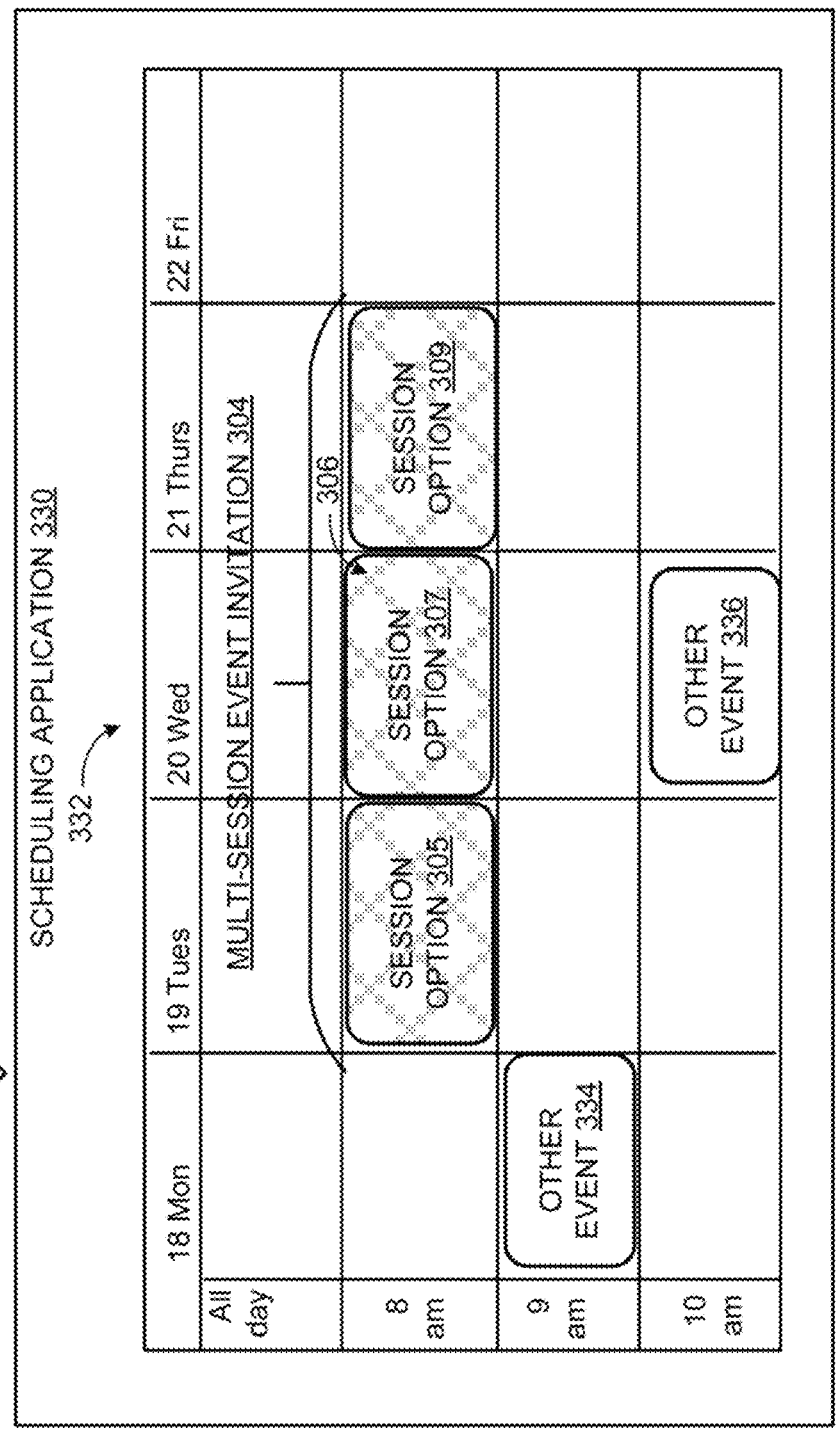
FIG. 3 is a display diagram illustrating example interaction scenario(s) between a scheduling application and a productivity application that provides a multi-session event invitation, according to embodiments.

FIG. 3 is a display diagram illustrating example interaction scenario(s) between a scheduling application and a productivity application that provides a multi-session event invitation, according to embodiments.

In a diagram 300, a scheduling module 326 of the productivity application 302 may generate a multi-session event invitation 304 from session options (305, 307, and 309). The multi-session event invitation 304 may include a highlighting scheme 306. The highlighting scheme may be provided to have the session options (305, 307, and 309) rendered in a contrast from other events (334 and 336) and/or other session options in the calendar view 332 of the scheduling application 330.

In an example scenario, the scheduling module 326 may create the multi-session event invitation 304 from the session options (305, 307, and 309) with durations that are identical. Alternatively, the organizer may select the session options (305, 307, and 309) with varying durations. In such a scenario, the durations of the session options may be specified as distinct.

A communication module of the productivity application 302 may transmit the multi-session event invitation 304 to a scheduling application 330 for rendering in a calendar view 332. The session options (305, 307, and 309) may be rendered with the highlighting scheme 306 to distinguish the session options (305, 307, and 309) as components of the multi-session event invitation 304.

Figure 4:
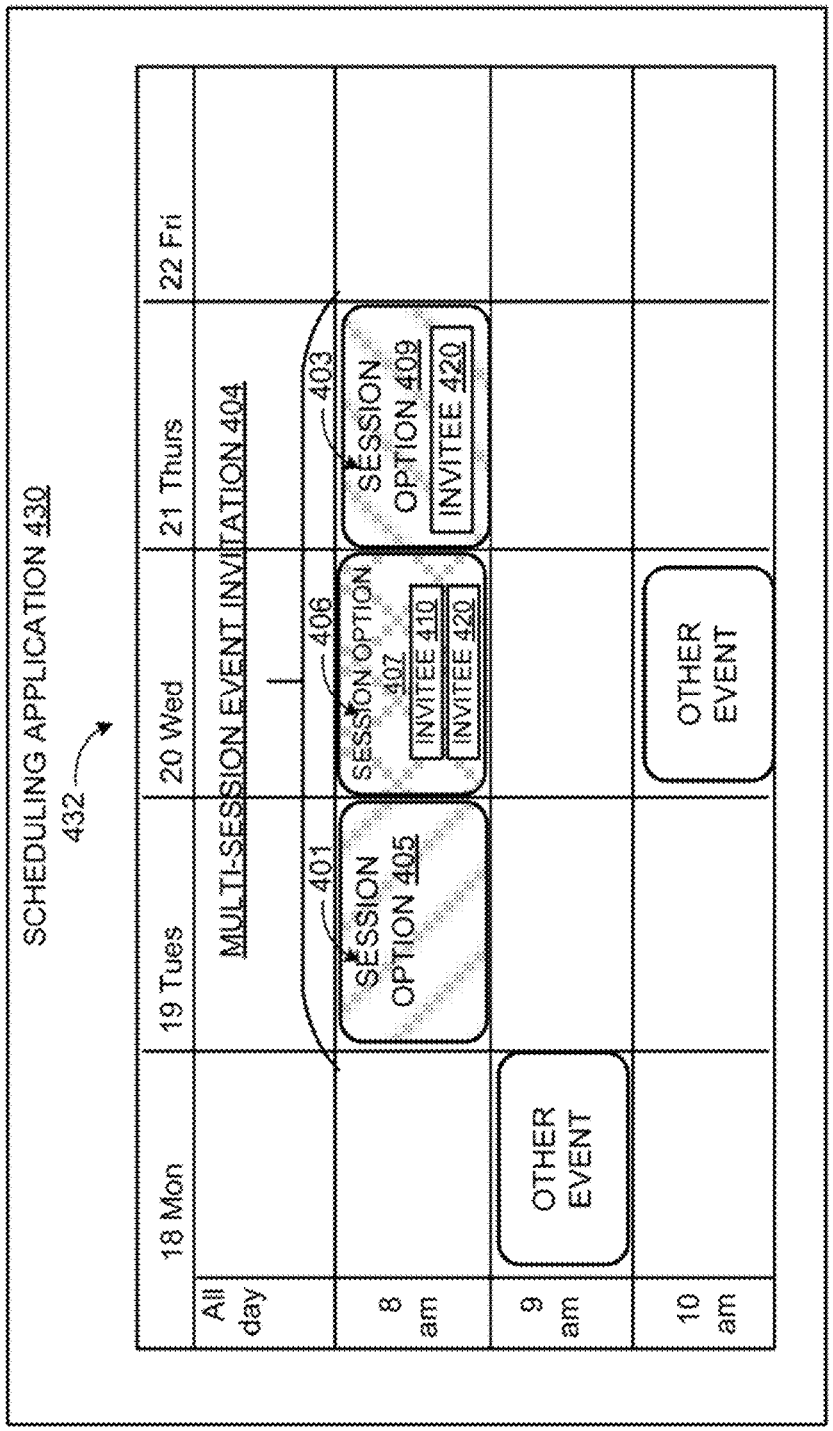
FIG. 4 is a display diagram illustrating further example interaction scenario(s) between a scheduling application and a productivity application that provides a multi-session event invitation, according to embodiments.

FIG. 4 is a display diagram illustrating example interaction scenario(s) between a scheduling application and a productivity application that provides a multi-session event invitation, according to embodiments.

In a diagram 400, a scheduling module 426 of a productivity application 402 may generate a multi-session event invitation 404 from session options (405, 407, and 409). The multi-session event invitation 404 may be provided to a scheduling application 430 (associated with an invitee) to have the multi-session event invitation 404 rendered in a calendar view 432 of the scheduling application 430.

A highlighting scheme 401 may be used to distinguish the session options (405, 407, and 409) as components of the multi-session event invitation 404. The highlighting scheme 401 may also be used to contrast the session options (405, 407, and 409) from other event(s) or other session option in the calendar view 432.

Additional highlighting schemes may be used to render information associated with the session options (405, 407, and 409). For example, a highlighting scheme 406 may be used to illustrate availability status associated with the invitees (410 and 420). In an example scenario, a schedule information associated with the invitee (410 and/or 420) may be received (and/or retrieved) from a scheduling source associated with the invitees (410 and 420). The schedule information may be compared to the session options (405, 407, and 409). The session options (407 and 409) that coincide with available time periods on the schedules of the invitees (410 and 420) may be distinguished.

For example, a highlighting scheme 406 may be used to distinguish the session option 407 from the session options (405 and 409) to illustrate the invitees (410 and 420) as available during the session options (405 and 409). Identifiers associated with the invitees (410 and 420) may also be displayed through the session option 407 to illustrate the invitees (410 and 420) as available.

Alternatively, a highlighting scheme 403 may be used to distinguish the session option 409 from the session options (405 and 407) to illustrate the invitee 420 as available during the session option 409. An identifier associated with the invitee 420 may also be displayed through the session option 409 to illustrate the invitee 420 as available. The scheduling application 430 may also be instructed to display only the session options (407 and/or 409) that coincide with the available time period associated with the invitees (410 and/or 420).

In another example scenario, the invitee(s) (410 and/or 420) may be detected as having selected the session option 407 as accepted for the event associated with the multi-session event invitation 404. In response, an acceptance information may be provided for rendering by the scheduling application 430. The acceptance information may include a number, an identifier, a group, and/or a relationship, among properties associated with the invitee(s) (410 and/or 420) who selected the session option 407 as accepted. Upon detecting an acceptance of the session option 407 by all of the invitees (410 and 420), the productivity application may transmit an instruction to remove rejected session options such as the session options (405 and 409) from the calendar view 432.

In a further example scenario, the productivity application 402 may detect a cancellation of a previously selected session option such as the session option 407 for the event. In such a scenario, the scheduling module 426 may instruct the scheduling application 430 to restore (previously removed) session options 405 and 409. The cancelled session option (the session option 407) may be removed from the calendar view of the scheduling application 430.

Figure 5:
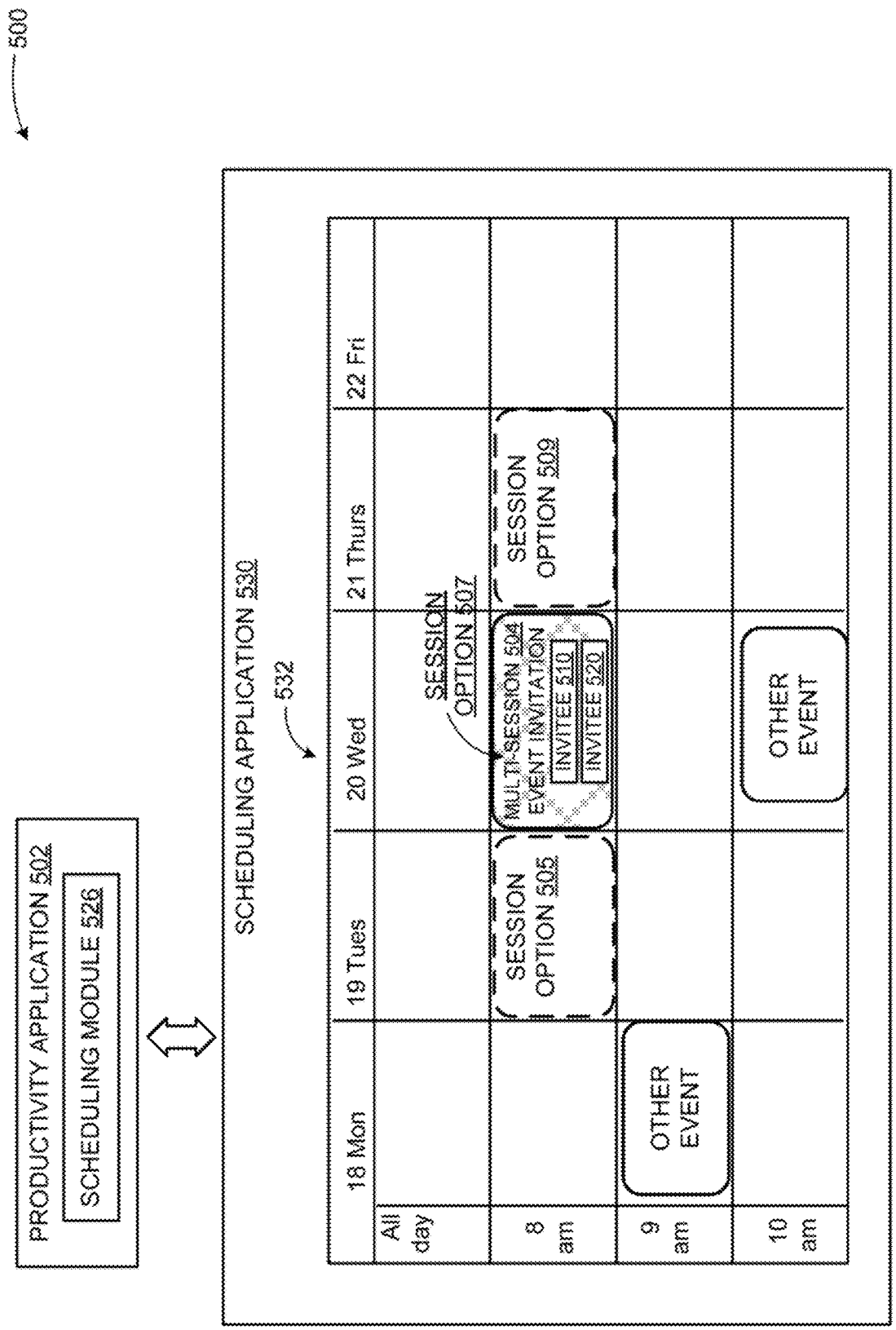
FIG. 5, is a display diagram illustrating an example scenario that illustrates selection of a session option for the multi-session event invitation, according to embodiments.

FIG. 5, is a display diagram illustrating an example scenario that illustrates selection of a session option for the multi-session event invitation, according to embodiments.

In a diagram 500, a scheduling module 526 of a productivity application 502 may detect a selection of session option 507 for the multi-session event invitation 504 by invitees (510 and 520). The invitees (510 and 520) may constitute all the invitees invited to the event associated with the multi-session event invitation 504.

For example, the scheduling module 526 may receive a notification from a scheduling application 530 (associated with an invitee 510). The notification may describe a selection of the session option 507 for the multi-session event invitation 504 by the invitee 510. Furthermore, the scheduling module 526 may receive another notification from other scheduling application associated with an invitee 520. The other notification may describe other selection of the session option 507 for the multi-session event invitation 504 by the invitee 520.

Upon selection of the session option 507 for the multi-session event invitation 504 by all of the invitees (510 and 520), the scheduling module 526 may designate the session option 507 for the multi-session event invitation 504. The scheduling module 526 may instruct the scheduling application 530 to remove the session options (505 and 509) and render the session option 507 as the multi-session event invitation 504 in a calendar view 532 to the invitee 510). Other scheduling application associated with the invitee 520 may similarly be instructed.

The scheduling module 526 may continue to provide the session options (505, 507, and 509) to the organizer to allow the organizer to view and/or edit the multi-session event invitation 504 based on the session options (505 and 509) that are not selected.

As discussed above, the productivity application 402 may be employed to provide a multi-session event invitation. An increased user efficiency with the productivity application 402 may occur as a result of automatically generating the multi-session event invitation from the session options (405, 407, and 409). Automatically generating the multi-session event invitation 404 from the session options (405, 407, and 409) by the productivity application 402, may also reduce processor load, increase processing speed, conserve memory, and reduce network bandwidth usage.

Embodiments, as described herein, address a need that arises from a lack of efficiency to provide multi-session event invitation. The actions/operations described herein are not a mere use of a computer, but address results that are a direct consequence of software used as a service offered to large numbers of users and applications.

The example scenarios and schemas in FIG. 1 through 5 are shown with specific components, data types, and configurations. Embodiments are not limited to systems according to these example configurations. Providing a multi-session event invitation may be implemented in configurations employing fewer or additional components in applications and user interfaces. Furthermore, the example schema and components shown in FIG. 1 through 5 and their subcomponents may be implemented in a similar manner with other values using the principles described herein.

Figure 6:
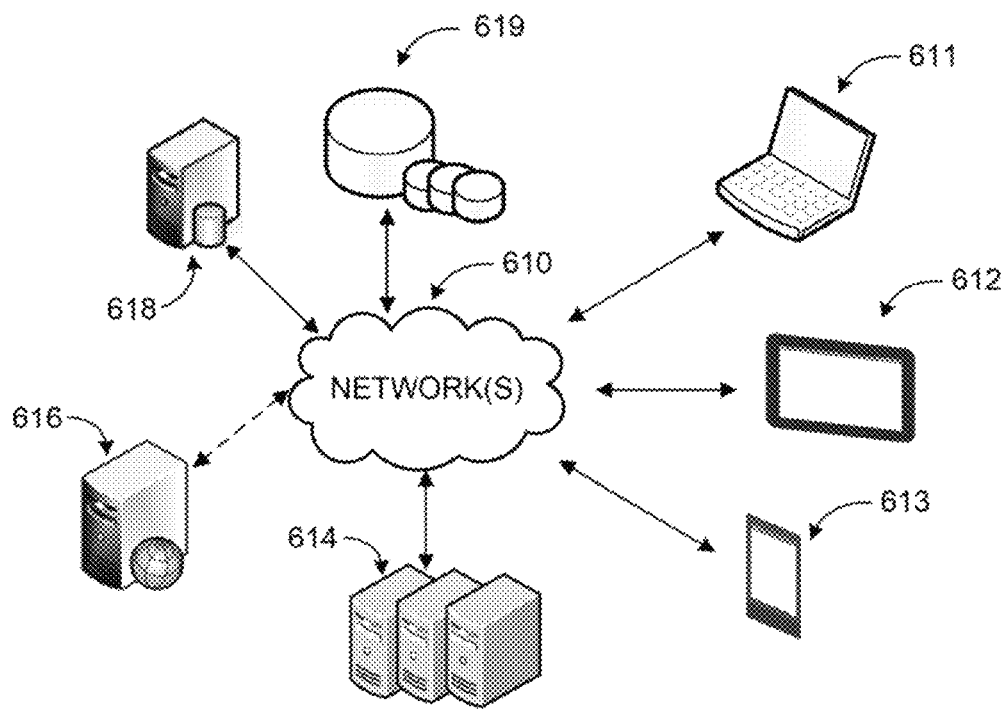
FIG. 6 is a simplified networked environment, where a system according to embodiments may be implemented.

FIG. 6 is an example networked environment, where embodiments may be implemented. A productivity application configured to provide a multi-session event invitation may be implemented via software executed over one or more servers 614 such as a hosted service. The platform may communicate with client applications on individual computing devices such as a smart phone 613, a mobile computer 612, or desktop computer 611 ('client devices') through network(s) 610.

Client applications executed on any of the client devices 611-613 may facilitate communications via application(s) executed by servers 614, or on individual server 616. A productivity application may detect a request to schedule an event with session options. Invitee(s) and information associated with the session options may be determined for the event. Next, the multi-session event invitation may be generated based on the information associated with the session options. Furthermore, the multi-session event invitation may be transmitted to the invitee(s). The productivity application may store data associated with the multi-session event invitation in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to provide a multi-session event invitation. Furthermore, the networked environments discussed in FIG. 6 are for illustration purposes only. Embodiments are not limited to the example applications, modules, or processes.

Figure 7:
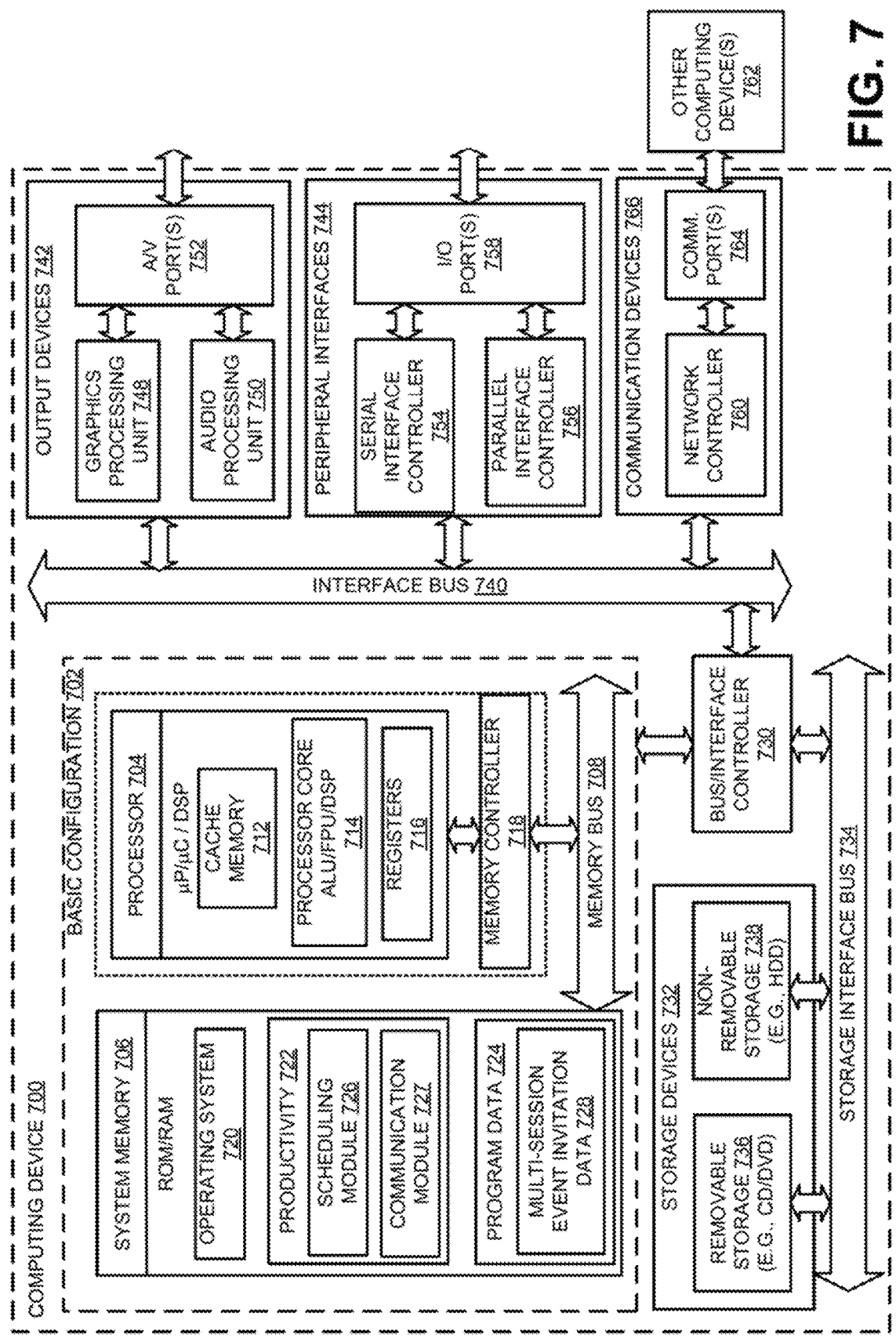
FIG. 7 is a block diagram of an example computing device, which may be used to provide a multi-session event invitation, according to embodiments.

FIG. 7 is a block diagram of an example computing device, which may be used to provide a multi-session event invitation, according to embodiments.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a productivity application 722, and a program data 724. The productivity application 722 may include components such as a scheduling module 726 and a communication module. The scheduling module 726 and the communication module may execute the processes associated with the productivity application 722. The scheduling module 726 may detect a request to schedule an event with session options. Invitee(s) and information associated with the session options may be determined for the event. Next, the multi-session event invitation may be generated based on the information associated with the session options. The communication module 727 may transmit the multi-session event invitation to the invitee(s).

Input to and output out of the productivity application 722 may be transmitted through a communication device 766 associated with the computing device 700. The communication device 766 may provide wired and/or wireless communication. The program data 724 may also include, among other data, multi-session event invitation data 728, or the like, as described herein. The multi-session event invitation data 728 may include information associated with invitee(s) and/or session option(s), among others.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 766) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example of the communication device(s) 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods to provide a multi-session event invitation. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
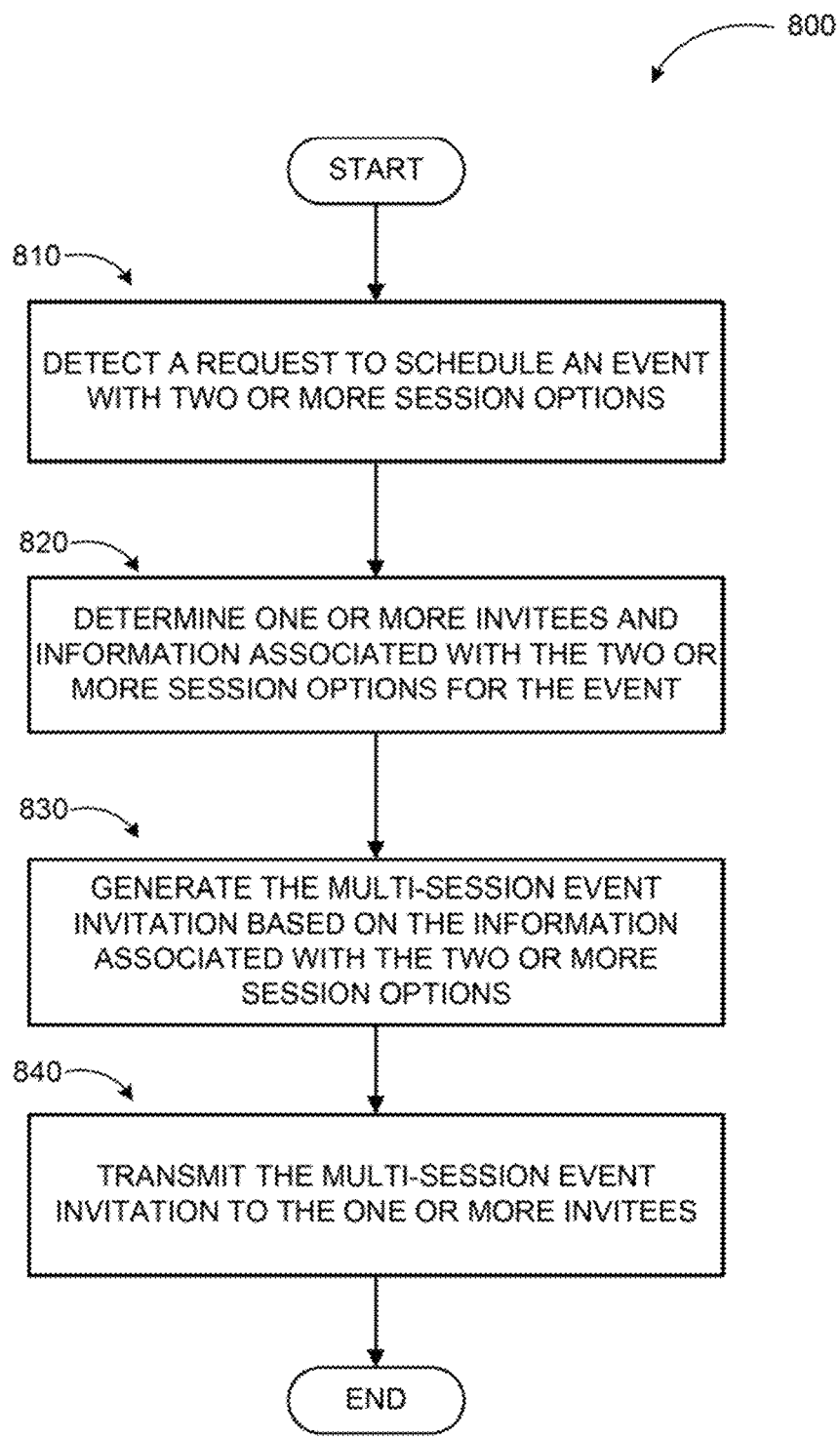
FIG. 8 is a logic flow diagram illustrating a process for providing a multi-session event invitation, according to embodiments.

FIG. 8 is a logic flow diagram illustrating a process for providing a multi-session event invitation, according to embodiments. Process 800 may be implemented on a computing device, such as the computing device 700 or another system.

Process 800 begins with operation 810, where the productivity application detect a request to schedule an event with session options. The event may include an activity that spans a time-period. A session option may include a time-period choice which an invitee may select for the event. At operation 820, invitee(s) and information associated with the session options may be determined for the event. The information associated with the session options may include a direct input from an organizer of the event, a schedule of the organizer of the event, schedule(s) of the invitee(s). Next, at operation 830, the multi-session event invitation may be generated based on the information associated with the session options. The multi-session event invitation may include a start time, an end time, a location, a content, and/or an access option associated with the session options. At operation 840, the multi-session event invitation may be transmitted to (a scheduling application associated with) the invitee(s).

The operations included in process 800 is for illustration purposes. Providing a multi-session event invitation may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a computing device to provide a multi-session event invitation is described. The computing device includes a communication device configured to communicate with one or more other computing devices, a memory configured to store instructions associated with a productivity application, and a processor coupled to the memory and the communication device. The processor executes the productivity application in conjunction with the instructions stored in the memory. The productivity application includes a scheduling module and a communication module. The scheduling module is configured to detect a request to schedule an event with two or more session options, determine one or more invitees and information associated with the two or more session options for the event, and generate the multi-session event invitation based on the information associated with the two or more session options. The communication module is configured to transmit, through the communication device, the multi-session event invitation to the one or more invitees.

According to other examples, the scheduling module is further configured to determine the one or more invitees through one or more of direct input from an organizer of the event and an inference based on information associated with the organizer of the event. The scheduling module is further configured to determine the information associated with the two or more session options based on one or more of a direct input from the organizer of the event, a schedule of the organizer of the event, and schedules of the one or more invitees of the event. The information associated with the two or more session options includes one or more of a start time, an end time, a location, a content, and an access option for each session option. The access option for each session option includes one or more of a physical meeting, an online meeting, a conference call, and a video call.

According to further examples, the communication module is further configured to transmit the multi-session event invitation to one or more scheduling applications or services associated with the one or more invitees. The scheduling module is further configured to instruct the one or more scheduling applications or services to render the two or more session options with a highlighting scheme in a calendar view. The highlighting scheme is configured to contrast the two or more session options from other events in the calendar view. The highlighting scheme is configured to contrast each of the two or more session options from other session options in the calendar view. The highlighting scheme includes one or more of a coloring based scheme, a shading based scheme, a text formatting based scheme, a graphic based scheme, a structure based scheme, and an animation based scheme.

According to other examples, the scheduling module is further configured to receive a schedule information associated with one of the one or more invitees, compare the two or more session options to the schedule information to identify one of the two or more session options that coincides with an available time period on a schedule of the invitee, and instruct a scheduling application associated with the invitee to distinguish the session option that coincides with the available time period from other session option. The scheduling module is further configured to instruct the scheduling application associated with the invitee to display only the session option that coincides with the available time period.

According to some examples, a method executed on a computing device to provide a multi-session event invitation is described. The method includes detecting a request to schedule an event with two or more session options, determining one or more invitees and information associated with the two or more session options for the event, generating the multi-session event invitation based on the information associated with the two or more session options, transmitting the multi-session event invitation to one or more scheduling applications or services associated with the one or more invitees, and providing a highlighting scheme to one or more scheduling applications or services associated with the one or more invitees for rendering the multi-session event invitation, where the highlighting scheme renders the two or more session options in a contrast from other events in a calendar view.

According to other examples, durations of the two or more session options are identical. Durations of the two or more session options are distinct. The method further includes detecting an accepted subset of the two or more session options that are selected by the one or more invitees for the event. The method further includes providing an acceptance information for rendering by the one or more scheduling applications or services, where the acceptance information includes one or more of: a number, one or more identifiers, one or more groups, and a relationship associated with the one or more invitees who selected the one or more accepted subset of the two or more session options. The method further includes transmitting an instruction to the one or more scheduling applications or services associated with the one or more invitees to remove a rejected subset of the two or more session options that are rejected by the one or more invitees from the calendar view.

According to some examples, a computer-readable memory device with instructions stored thereon to provide a multi-session event invitation is described. The instructions include actions that are similar to the actions of the method.

According to other examples, the instructions further include receiving a schedule information associated with a selected invitee from the one or more invitees, comparing the two or more session options to the schedule information to identify an available session option from the two or more session options that coincide with an available time period on a schedule of the selected invitee, and instructing the one or more scheduling applications or services associated with the one or more invitees to designate the selected invitee as available in relation to the available session option.

According to some examples, a means for providing a multi-session event invitation is described. The means for providing a multi-session event invitation includes a means for detecting a request to schedule an event with two or more session options, a means for determining one or more invitees and information associated with the two or more session options for the event, a means for generating the multi-session event invitation based on the information associated with the two or more session options, and a means for transmitting the multi-session event invitation to the one or more invitees.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide a multi-session event invitation and control rejections and restorations of sessions, the computing device comprising:
 a memory configured to store instructions associated with a productivity application;
 a processor coupled to the memory, the processor configured to
  detect a request to schedule a multi-session event with two or more session options, wherein the multi-session event occurs during each of the two or more session options;

determine, with a productivity application, one or more invitees and information associated with the two or more session options for the multi-session event;
generate the multi-session event invitation based on the information associated with the two or more session options;
transmit the multi-session event invitation to the one or more invitees;
detect a first selection of one of the two or more session options, the first selection associated with a first invitee of the one or more invitees;
in response to detecting the first selection, transmit, with the productivity application, a first instruction to a computing device associated with the first invitee over a network to (a) render the first selected session option as a first accepted session option for the multi-session event in a first calendar view of the first invitee and (b) remove a first set of non-selected session options from the two or more session options for the multi-session event from the first calendar view of the first invitee;
detect a second selection of one of the two or more session options, the second selection associated with a second invitee of the one or more invitees;
in response to detecting the second selection, transmit, with the productivity application, a second instruction to a computing device associated with the second invitee over a network to (a) render the second selected session option as a second accepted session option for the multi-session event in a second calendar view of the second invitee, wherein the second accepted session option is different from the first accepted session option, and (b) remove a second set of non-selected session options from the two or more session options for the multi-session event from the second calendar view of the second invitee;
detect a cancellation of the second accepted session option for the multi-session event; and
automatically, in response to detecting the cancellation, with the productivity application, transmit a third instruction to a computing device associated with the second invitee over a network to restore the second set of non-selected session options from the two or more session options for the multi-session event to the second calendar view of the second invitee.

2. The computing device of claim 1, wherein the processor is further configured to determine the one or more invitees through one or more of direct input from an organizer of the multi-session event and an inference based on information associated with the organizer of the multi-session event.

3. The computing device of claim 1, wherein the processor is further configured to determine the information associated with the two or more session options based on one or more of a direct input from an organizer of the multi-session event, a schedule of the organizer of the multi-session event, and schedules of the one or more invitees of the multi-session event.

4. The computing device of claim 1, wherein the information associated with the two or more session options includes one or more of a start time, an end time, a location, a content, and an access option for each session option, wherein the access option for each session option includes one or more of a physical meeting, an online meeting, a conference call, and a video call.

5. The computing device of claim 1, wherein the processor is further configured to transmit the multi-session event invitation to one or more scheduling applications or services associated with the one or more invitees.

6. The computing device of claim 5, wherein the processor is further configured to: instruct the one or more scheduling applications or services to render the two or more session options with a highlighting scheme in a calendar view,
wherein the highlighting scheme includes one or more of a coloring based scheme, a shading based scheme, a text formatting based scheme, a graphic based scheme, a structure based scheme, and an animation based scheme.

7. The computing device of claim 6, wherein the processor is configured to provide a highlighting scheme that contrasts the two or more session options from at least one selected from a group consisting of other events and other session options.

8. The computing device of claim 1, wherein the processor is further configured to:
receive a schedule information associated with the first invitee;
compare the two or more session options to the schedule information to identify one of the two or more session options that coincides with an available time period on a schedule of the first invitee; and
instruct a scheduling application associated with the first invitee to distinguish the one of the two or more session options that coincides with the available time period from other session options.

9. The computing device of claim 8, wherein the processor is further configured to:
instruct the scheduling application associated with the first invitee to display only the one of the two or more session options that coincides with the available time period.

10. A method executed on a computing device to provide a multi-session event invitation and control rejections and restorations of sessions, the method comprising:
detecting, with a processor, a request to schedule a multi-session event with two or more session options, wherein the multi-session event occurs during each of the two or more session options;
determining, with a productivity application, with the processor, one or more invitees and information associated with the two or more session options for the multi-session event;
generating, with the processor, the multi-session event invitation based on the information associated with the two or more session options;
transmitting, with the processor, the multi-session event invitation to one or more scheduling applications or services associated with the one or more invitees;
providing, with the processor, a highlighting scheme to one or more scheduling applications or services associated with the one or more invitees for rendering the multi-session event invitation, wherein the highlighting scheme renders the two or more session options in a contrast from other events in calendar views of the one or more invitees;
detecting, with the processor, a first selection of one of the two or more session options, the first selection associated with a first invitee of the one or more invitees;
in response to detecting the first selection, transmitting, with the processor, with the productivity application, a first instruction to a computing device associated with the first invitee over a network to (a) render the first selected session option as a first accepted session option for the multi-session event in a first calendar view of the first invitee and (b) remove a first set of non-selected session options from the two or more session options for the multi-session event from the first calendar view of the first invitee;

detecting, with the processor, a second selection of one of the two or more session options, the second selection associated with a second invitee of the one or more invitees;

in response to detecting the second selection, transmitting, with the processor, with the productivity application, a second instruction to a computing device associated with the second invitee over a network to (a) render the second selected session option as a second accepted session option for the multi-session event in a second calendar view of the second invitee, wherein the second accepted session option is different from the first accepted session option, and (b) remove a second set of non-selected session options from the two or more session options for the multi-session event from the second calendar view of the second invitee;

detecting, with the processor, a cancellation of the second accepted session option for the multi-session event; and automatically, in response to detecting the cancellation, transmitting, with the productivity application, with the processor, a third instruction to a computing device associated with the second invitee over a network to restore the second set of non-selected session options from the two or more session options for the multi-session event to the second calendar view of the second invitee.

11. The method of claim 10, wherein durations of the two or more session options are identical.

12. The method of claim 10, wherein durations of the two or more session options are distinct.

13. The method of claim 10, further comprising:
providing an acceptance information for rendering by the one or more scheduling applications or services, wherein the acceptance information includes one or more of: a number, one or more identifiers, one or more groups, and a relationship associated with the one or more invitees.

14. A non-transitory computer-readable memory device with instructions stored thereon that, when executed by a processor, causes the processor to provide a multi-session event invitation and control rejections and restorations of sessions, the instructions comprising:
detecting a request to schedule a multi-session event with two or more session options, wherein the multi-session event occurs during each of the two or more session options;
determining, with a productivity application, one or more invitees and information associated with the two or more session options for the multi-session event;
generating the multi-session event invitation based on the information associated with the two or more session options;
transmitting the multi-session event invitation to one or more scheduling applications or services associated with the one or more invitees;
providing a highlighting scheme to one or more scheduling applications or services associated with the one or more invitees for rendering the multi-session event invitation, wherein the highlighting scheme renders the two or more session options in a contrast from other events in calendar views of the one or more invitees;
detecting a first selection of one of the two or more session options, the first selection associated with a first invitee of the one or more invitees;
in response to detecting the first selection, transmitting, with the productivity application, a first instruction to a computing device associated with the first invitee over a network to (a) render the first selected session option as a first accepted session option for the multi-session event in a first calendar view of the first invitee and (b) remove a first set of non-selected session options from the two or more session options for the multi-session event from the first calendar view of the first invitee;
detecting a second selection of one of the two or more session options, the second selection associated with a second invitee of the one or more invitees;
in response to detecting the second selection, transmitting, with the productivity application, a second instruction to a computing device associated with the second invitee over a network to (a) render the second selected session option as a second accepted session option for the multi-session event in a second calendar view of the second invitee, wherein the second accepted session option is different from the first accepted session option, and (b) remove a second set of non-selected session options from the two or more session options for the multi-session event from the second calendar view of the second invitee;
detecting a cancellation of the second accepted session option for the multi-session event; and
automatically, in response to detecting the cancellation, transmitting, with the productivity application, a third instruction to a computing device associated with the second invitee over a network to restore the second set of non-selected session options from the two or more session options for the multi-session event to the second calendar view of the second invitee.

15. The non-transitory computer-readable memory device of claim 14, wherein the instructions further comprise:
receiving a schedule information associated with a selected invitee from the one or more invitees;
comparing the two or more session options to the schedule information to identify an available session option from the two or more session options that coincide with an available time period on a schedule of the selected invitee; and
instructing the one or more scheduling applications or services associated with the one or more invitees to designate the selected invitee as available in relation to the available session option.

16. The computing device of claim 1, wherein the one or more invitees are determined based on whether the one or more invitees work on a project related to the multi-session event invitation.

17. The computing device of claim 1, wherein the one or more invitees are determined based on a common property between the multi-session event invitation and the one or more invitees.

18. The computing device of claim 1, wherein the one or more invitees are determined based on whether the one or more invitees are available during at least one of the two or more session options.

19. The computing device of claim 1, wherein the one or more invitees are determined based on whether the one or more invitees are in a proximity to the multi-session event during at least one of the two or more session options.

* * * * *